Figure 1:
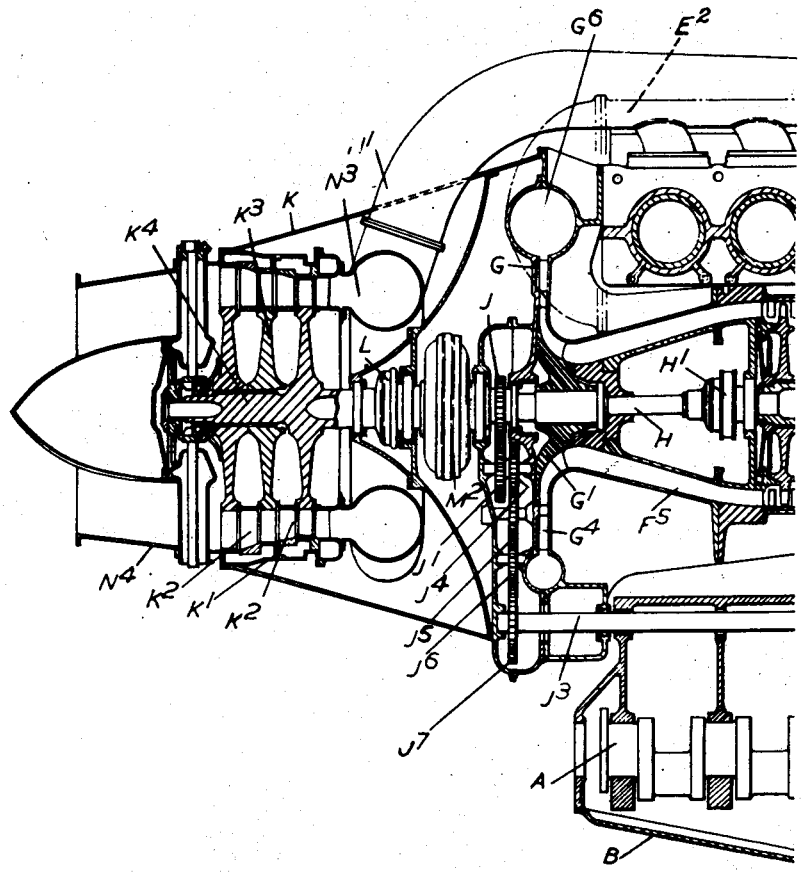

July 21, 1953 H. SAMMONS 2,645,897
RECIPROCATING INTERNAL-COMBUSTION ENGINE OPERATING
ON THE TWO-STROKE CYCLE WITH EXHAUST TURBINE
Filed April 3, 1950 6 Sheets-Sheet 1

Inventor
Herbert Sammons
By
Emery, Holcombe & Blair
Attorney

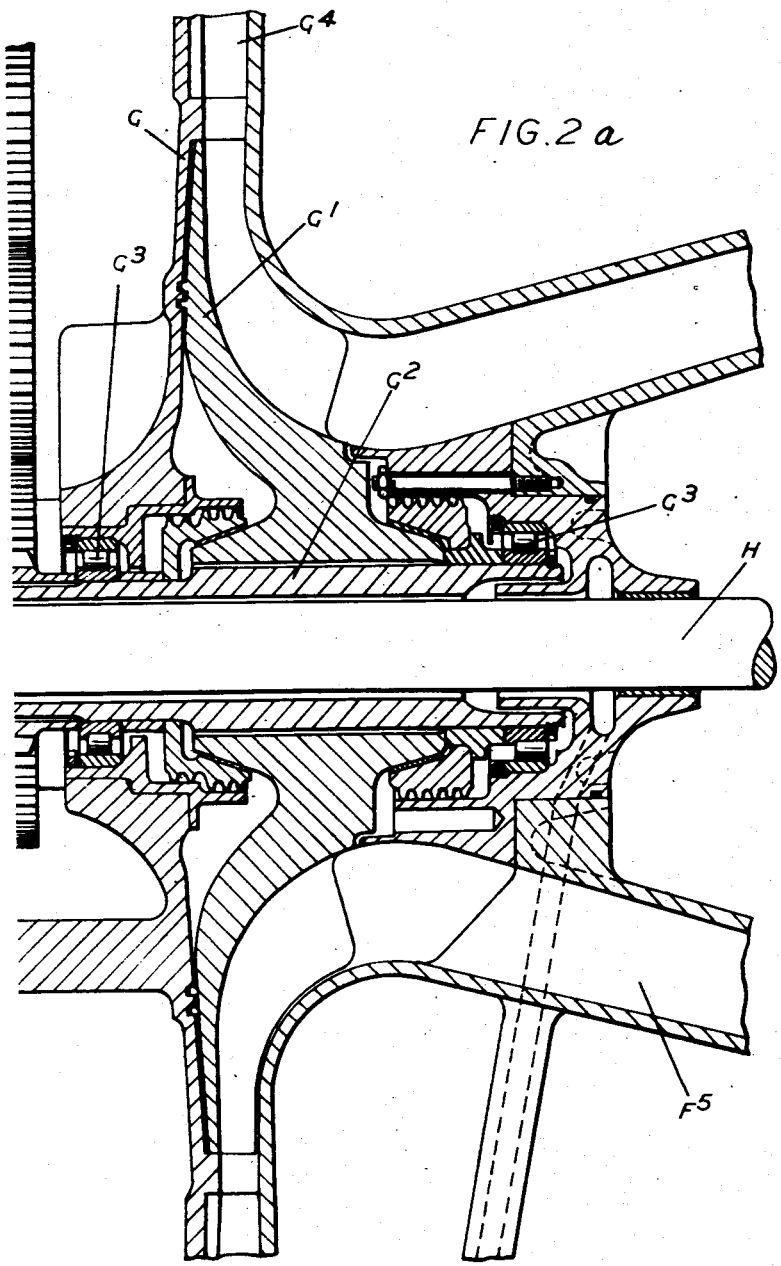

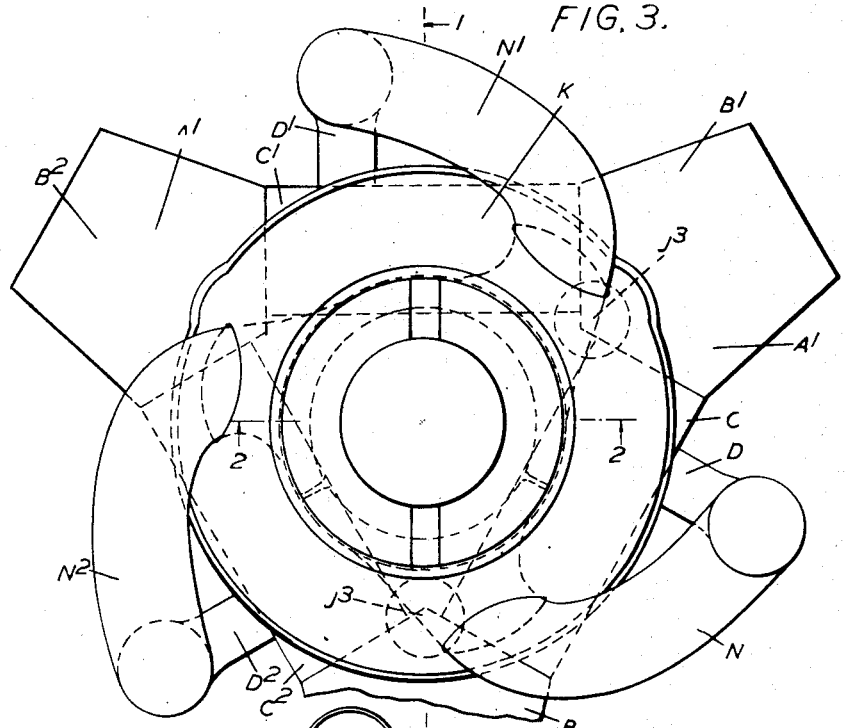
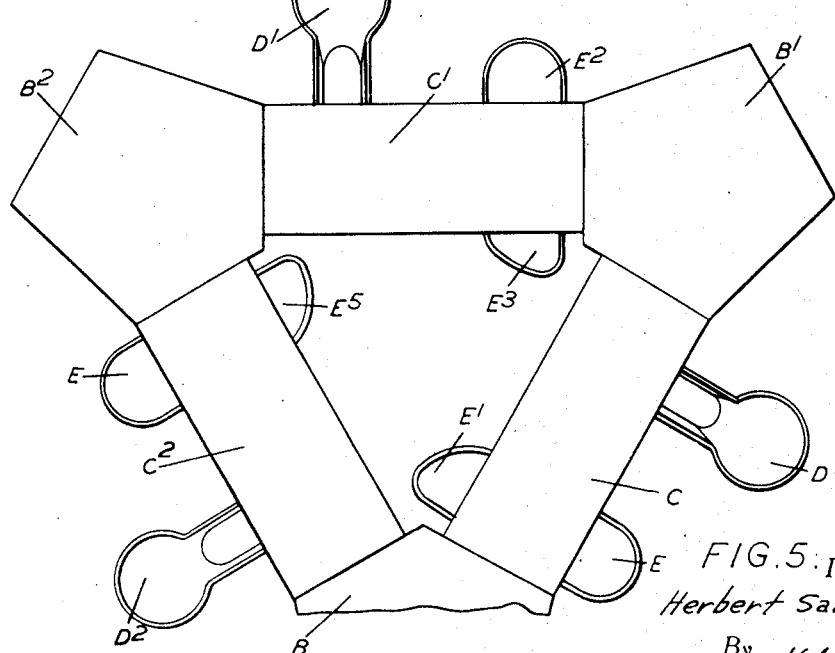

July 21, 1953
H. SAMMONS
2,645,897
RECIPROCATING INTERNAL-COMBUSTION ENGINE OPERATING
ON THE TWO-STROKE CYCLE WITH EXHAUST TURBINE
Filed April 3, 1950
6 Sheets-Sheet 6
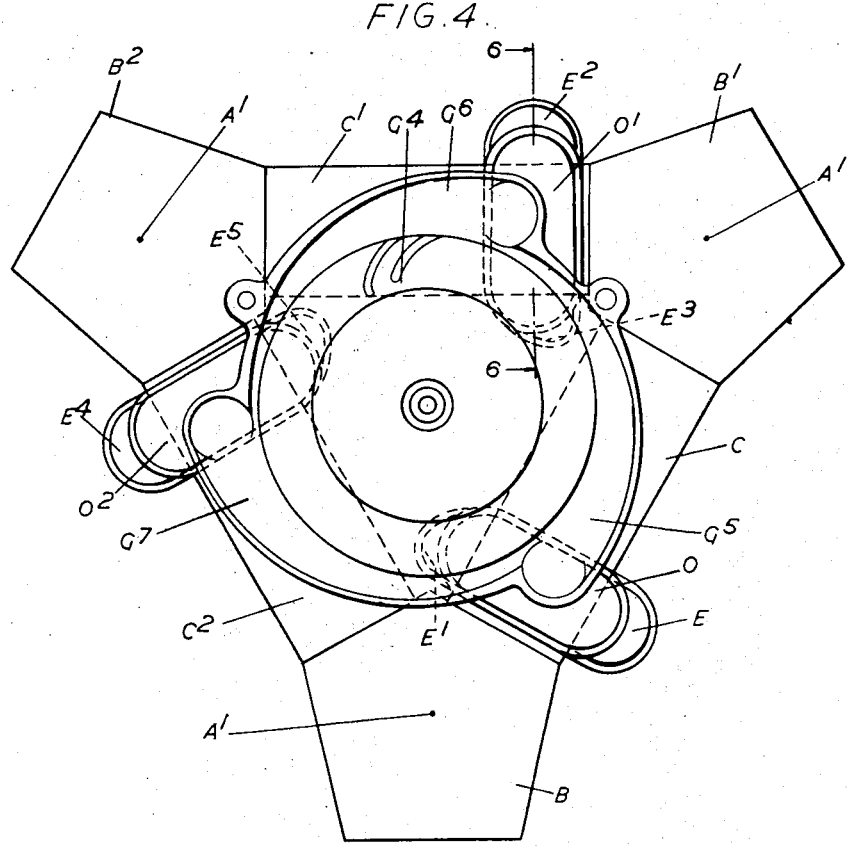
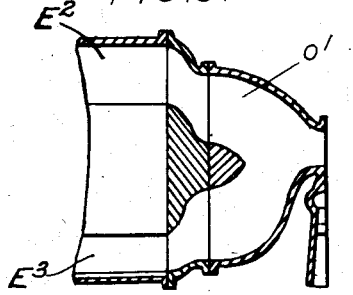
Inventor
Herbert Sammons
By Emery, Holcombe & Blair
Attorney Patented July 21, 1953

2,645,897

UNITED STATES PATENT OFFICE 2,645,897

RECIPROCATING INTERNAL-COMBUSTION ENGINE OPERATING ON THE TWO-STROKE CYCLE WITH EXHAUST TURBINE

Herbert Sammons, Gerrards Cross, England, assignor to D. Napier & Son Limited, London, England, a company of Great Britain Application April 3, 1950, Serial No. 153,526
In Great Britain April 11, 1949

4 Claims. (Cl. 60—13)

This invention relates to reciprocating internal combustion engines operating on the two-stroke cycle of the kind comprising three crankshafts having their axes parallel to one another and disposed at the apices of a triangle, the crankshafts being enclosed in crank cases between each adjacent pair of which extend cylinders with two pistons in each cylinder connected respectively to the adjacent crankshafts and controlling respectively inlet and exhaust ports in the cylinder wall.

One of the objects of the invention is to provide an engine of the above general kind which will be efficient and at the same time mechanically compact.

In a reciprocating internal combustion engine of the kind referred to according to the present invention a multi-stage axial flow air compressor for supplying air directly or indirectly to the inlet ports in the cylinders is housed at least partially in the approximately triangular space enclosed between the three cylinder blocks and the crank cases between which they extend. For convenience this space will hereinafter be referred to as the triangular space.

Generally each cylinder block will comprise a substantial number of cylinders, say four or six, so that the triangular space enclosed by the cylinder blocks and crank cases will be comparatively long and the multi-stage axial flow air compressor can thus be completely accommodated within this space.

Further in most cases it will be desirable to provide in addition to the axial flow air compressor a centrifugal air compressor mounted on one end of the unit comprising the cylinder blocks and crank cases, with delivery ducts leading from the centrifugal compressor to the inlet ports while an intermediate duct connects the inlet duct of the centrifugal compressor to the adjacent delivery duct of the axial flow compressor so that when both the axial flow compressor and the centrifugal compressor are operating the centrifugal compressor constitutes a final air compression stage which is additional to the various compression stages of the axial flow compressor. In such a construction it will be convenient for the primary inlet duct leading air to the inlet of the axial flow compressor to pass directly through the adjacent end of the triangular space, that is to say the end of that space remote from the centrifugal compressor, the latter in most cases substantially or completely closing the other end of this space.

According to a further feature of the invention the axial flow compressor is arranged to be driven by an exhaust driven turbine to which ducts lead the exhaust gas from the exhaust ports of the engine, this turbine conveniently being coaxial with the axial flow compressor and situated outside the space between the cylinder blocks and crank cases. Further, when, as is generally preferred, a centrifugal compressor is provided in the manner above described in addition to the axial flow compressor, a mechanical drive is preferably provided for the rotor of the centrifugal compressor from the crankshafts of the engine, while, in addition, a clutch device is provided whereby the rotor of the turbine can be caused to transmit power to some element of the engine in direct mechanical transmission with the crankshafts and/or vice versa preferably to the gearing through which the rotor of the centrifugal compressor is driven. In this way surplus power from the turbine can be transmitted to the rotary parts of the engine proper and/or the turbine and axial flow compressor assembly can be driven from the crankshafts of the engine.

Thus in one convenient arrangement according to the invention the axial flow compressor, the centrifugal compressor and the turbine are arranged upon a common axis with the centrifugal compressor situated between the axial flow compressor and the turbine, the rotor of the centrifugal compressor being mechanically driven by gearing from the crankshafts and having a hollow bore through which passes a shaft which is connected at one end of the rotor of the axial flow compressor and at its other end to the turbine rotor and one member of a fluid clutch of the fluid flywheel type the other member of which is connected to the rotor of the centrifugal compressor. In such an arrangement the fluid clutch may if desired be of the kind which can be rendered operative or inoperative at will by control of the fluid content of the working chambers.

Figure 1A:
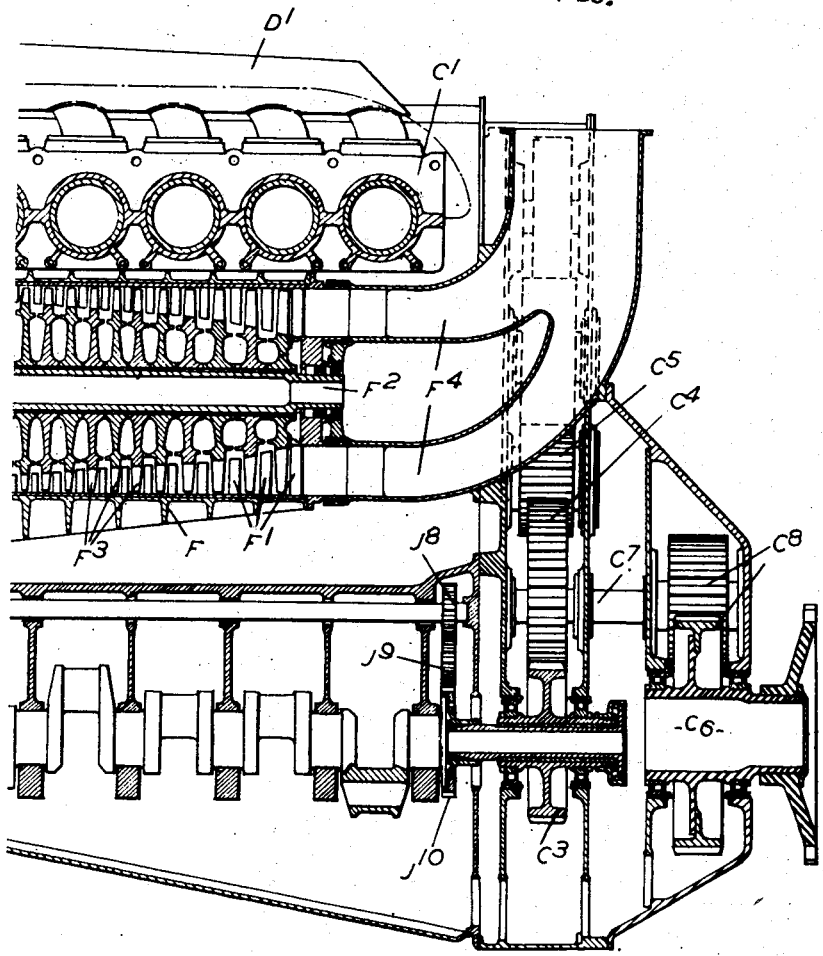
Figure 2:
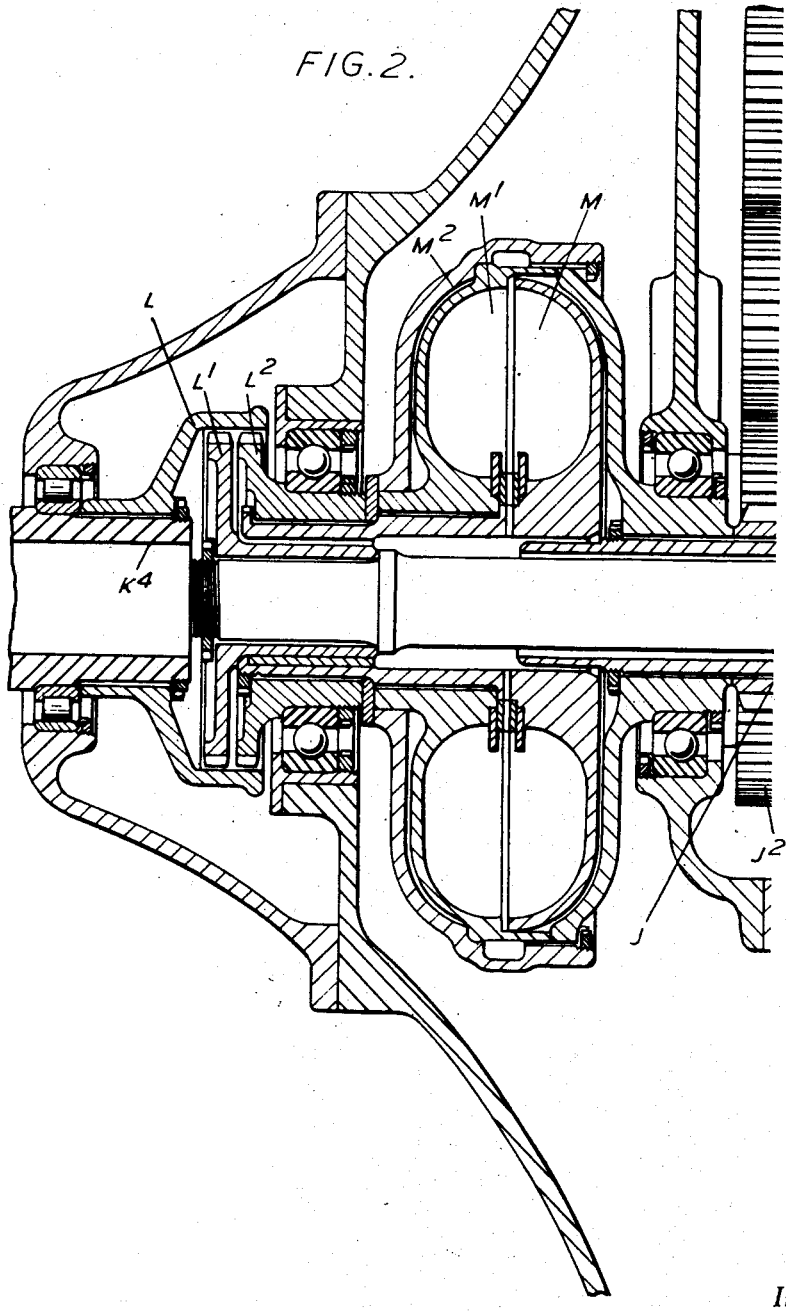

The invention may be carried into practice in various ways but one construction according to the invention is shown somewhat diagrammatically in the accompanying drawings, in which Figures 1 and 1a show a sectional side elevation of the complete engine, the section being taken on the line 1—1 of Figure 3, Figures 2 and 2a show a sectional inverted plan view on an enlarged scale on the line 2—2 of Figure 3 illustrating certain details associated with the driving of the centrifugal and axial flow compressors, Figure 3 is a somewhat diagrammatic rear elevation of the engine shown in Figure 1, Figure 4 is a diagrammatic sectional rear elevation the section being taken in the plane in which lie the two mating faces of the front and rear halves of the casing of the centrifugal compressor so as to show the form of the volute outlet chambers of such compressor and the form of the inlet manifolds into which they lead, Figure 5 is a diagrammatic cross sectional view to show the forms of the parts of the inlet and exhaust manifolds which extend along the cylinders, and Figure 6 is a cross section through the passage connecting an inlet manifold to the centrifugal compressor and the adjacent part of the inlet manifold taken in the plane 6—6 of Figure 4.

In the construction illustrated the engine comprises three similar crankshafts A of which one is shown in Figure 1, each of the six-throw type with their axes $A^1$ parallel to one another and situated at the apices of an equilateral triangle. The crankshafts are supported in crank cases B, $B^1$, $B^2$ and each crank case is connected to the other two by a block of water-cooled cylinders C, $C^1$, $C^2$. Each block of cylinders includes six open-ended cylinder bores in the opposite ends of each of which reciprocate two pistons coupled by connecting rods respectively to cranks on the two adjacent crankshafts. The crankshafts are connected to one another at the front end of the engine by gearing as indicated at $C^3$, $C^4$, $C^5$ in Figure 1 so that two of the crankshafts of which the bottom crankshaft is one, rotate in one direction while the other rotates in the opposite direction. The gearing also connects the crankshafts to a driven shaft $C^6$ through a shaft $C^7$ and gearing $C^8$. The phasing of the crankshafts is such that while the two pistons in each cylinder move for most of their travel in opposite directions relatively to the cylinder, they are 20° out of phase so that one piston completes its instroke and outstroke somewhat before the other piston. The two pistons in each cylinder control respectively a ring of inlet ports and a ring of exhaust ports situated where they will be uncovered respectively by the two pistons at the ends of their outstrokes, the arrangement being the usual one in which the exhaust ports open somewhat before the inlet ports and close approximately at the same moment as or somewhat after the inlet ports.

The inlet ports in each cylinder communicate in known manner with an inlet belt surrounding the cylinder while the exhaust ports communicate with an exhaust belt similarly surrounding the cylinder, the exhaust belts of each cylinder block communicating with an exhaust manifold situated on the side of the cylinder block remote from the triangular space between the cylinder blocks, while the inlet belts of each cylinder block communicate with the two parts of a split inlet manifold one part of which extends along the side of the block adjacent to the triangular space between the cylinder blocks while the other part extends along the side of the block remote from this triangular space.

The exhaust manifolds are shown in the drawings at D, $D^1$, $D^2$ while the inlet manifolds are shown at E, $E^1$, $E^2$, $E^3$, $E^4$, $E^5$, the parts E and $E^1$ constituting one split manifold, the parts $E^2$ and $E^3$ another split manifold and the parts $E^4$, $E^5$ the third split manifold.

The general construction of the engine is of known type and will not, therefore, be further described, a special form of such an engine being described in the specification of United States of America patent application No. 153,053, now Patent No. 2,601,584, the invention described in which is preferably also applied to engines according to the present invention.

Mounted within the triangular space between the cylinder blocks is a multi-stage axial flow compressor comprising a casing F supported from the cylinder and carrying the stationary blade rings $F^1$ of the various compressor stages. The casing F is provided with bearings supporting a rotor shaft $F^2$ carrying the bladed rotors $F^3$ of the various stages. In the construction shown the axial flow compressor has 12 stages and is arranged to draw air from an inlet passage $F^4$ at the front end of the engine and to deliver it after compression through an annular delivery passage $F^5$ (hereinafter called for convenience the intermediate delivery passage).

Mounted on the rear end of the engine is a centrifugal compressor comprising an impeller casing G in which is mounted a centrifugal impeller $G^1$. The impeller $G^1$ is mounted on a hollow shaft $G^2$ supported in bearings $G^3$ and through the bore of the shaft $G^2$ passes freely a shaft H connected by a coupling $H^1$ to the rotor of the axial flow compressor.

The centrifugal compressor impeller $G^1$ is arranged to deliver air through a diffuser $G^4$ into three delivery volutes $G^5$, $G^6$, $G^7$ and is driven from the crankshafts through gearing comprising a gearwheel J on the impeller shaft $G^2$ meshing with two gearwheels $J^1$, $J^2$ shown respectively in Figure 1 and Figure 2 which are connected through further gearing respectively to two torsionally flexible shafts $J^3$ extending to points adjacent to the front of the engine. The ends of the shafts $J^3$ adjacent to the front of the engine are connected by further gearing respectively to the crankshaft A and to the crankshaft of which the axis $A^1$ is indicated in Figures 3 and 4. The gearing by which the gear wheel $J^1$ is connected through its associated shaft $J^3$ to the crankshaft A is shown in Figure 1 and since the gearing by which the gearwheel $J^2$ is connected to its associated crankshaft is similar it is not separately illustrated. The gearing associated with the gearwheel $J^1$ and shown in Figure 1 comprises a gearwheel $J^4$ rigid with the shaft carrying the gearwheel $J^1$ and meshing with a gear wheel $J^5$ which in turn meshes with a gearwheel $J^6$ meshing with a gearwheel $J^7$ on the rear end of the shaft $J^3$. The other end of the shaft $J^3$ carries a gearwheel $J^8$ meshing with a gearwheel $J^9$ which in turn meshes with a gearwheel $J^{10}$ on the crankshaft A.

It will thus be seen that the impeller $G^1$ is driven from the crankshafts through two parallel transmission paths each including a torsionally flexible shaft which not only tends to ensure an even distribution of the load between the two transmission paths but also to prevent overstressing of the gearing during rapid accelerations or decelerations of the engine.

Supported by a casing K from the rear wall of the engine is an exhaust driven turbine comprising a casing $K^1$ carrying the stationary blade rings $K^2$ and a rotor $K^3$ having three rotor blade rings carried by a rotor shaft $K^4$. The front end of the rotor shaft $K^4$ has rigidly mounted thereon the outer internally toothed member L of a transmission coupling device having two externally toothed inner members $L^1$ and $L^2$ as shown in Figure 2, to each of which the shaft K⁴ is thus rotationally coupled.

The inner member L¹ is mounted on the rear end of the shaft H so that the rotor of the axial flow compressor F is permanently connected thereby to the shaft K⁴ of the gas turbine K¹. The inner member L² on the other hand is connected to one of the reaction members M of a hydraulic transmission clutch the other reaction member M¹ of which is rigidly supported within the casing M² of the hydraulic clutch which is connected to the adjacent end of the shaft G² of the centrifugal impeller G¹.

The three exhaust manifolds D, D¹, D² are connected by exhaust gas passages N, N¹, N² to an annular collector chamber N³ from which the exhaust gases pass in the usual manner through a nozzle ring to the first stage of the turbine K¹ while the exhaust gases leaving the turbine pass into an exhaust pipe the end of which is shown at N⁴.

The three delivery volutes G⁵, G⁶, G⁷ of the centrifugal compressor communicate through connecting pieces O, O¹, O² with the adjacent ends of the split inlet manifolds E, E¹, E², E³, and E⁴, E⁵ respectively.

The hydraulic clutch M² may be of the permanently filled type but is preferably of the type the filling of which can be controlled so as to render it operative and inoperative at will and is such that it can transmit torque in both directions that is to say from the member M to the member M¹ or from the member M¹ to the member M.

With the construction described with reference to the drawings it will be seen that when the engine is being started, the centrifugal compressor G will be in operation and supply air to the inlet ports through the split inlet manifolds E, E¹, E², E³, E⁴, E⁵, while, further, if the hydraulic clutch M² be filled the rotor of the axial flow compressor F is driven by reason of the transmission of torque from the shaft G² through the clutch M² to the member L² and by it through the member L to the member L¹ and hence to the shaft H, thus reducing or eliminating the resistance to air flow through the axial flow compressor to the inlet to the centrifugal compressor which would otherwise be present.

When the engine is in operation normally under load the exhaust gases will pass through the manifolds D, D¹, D² and the passages N, N¹, N², to the turbine K¹ which will then drive the axial flow compressor through the coupling device L, L¹. Moreover, if the hydraulic clutch M² be operative, any power developed by the turbine in excess of that required to drive the axial flow compressor will be transmitted to the shaft G² of the impeller of the centrifugal compressor this power either being sufficient only to assist in the driving of the centrifugal compressor or being substantially sufficient to drive this compressor or being such that it not only supplies sufficient torque to drive the centrifugal compressor but also transmits torque through the gearing connecting the impeller of the centrifugal compressor to the crankshafts so as to add to the power delivered through the shaft C⁶.

It will be seen that the arrangement according to the invention provides a very compact power unit having a considerable degree of flexibility since the proportions of power derived respectively from the pistons and from the turbine can vary widely according to working conditions, while at the same time ensuring satisfactory efficiency in view of the high over-all compression ratio which can be used and the utilisation of substantially the whole of the expansion in producing useful work.

What I claim as my invention and desire to secure by Letters Patent is:

1. A power unit comprising a reciprocating internal combustion engine operating on the two-stroke cycle and including in combination three crankshafts the axes of which are parallel to one another and lie on the apices of an equilateral triangle, crankcases supporting the crankshafts, a cylinder block extending between each adjacent pair of crankcases and including open ended cylinders having inlet and exhaust ports at longitudinally displaced points in their walls, two pistons in each cylinder connected respectively to the crankshafts in the two crankcases between which the cylinder extends and acting respectively to uncover the inlet and exhaust ports at the ends of their outstrokes, exhaust passages leading from the exhaust ports, inlet passages leading to the inlet ports, a centrifugal compressor arranged to deliver a gaseous charge to the inlet passages, an axial flow compressor housed at least partially in the approximately triangular space enclosed between the three cylinder blocks the rotor of which is co-axial with that of the centrifugal compressor, the axial flow compressor being arranged to deliver a gaseous charge to the inlet of the centrifugal compressor, an elastic fluid turbine arranged co-axially with the centrifugal compressor and the axial flow compressor and arranged to receive working fluid from the exhaust passages, the centrifugal compressor lying between the turbine and the axial flow compressor and having a hollow rotor shaft through which passes a shaft by which the turbine rotor is directly connected to the rotor of the axial flow compressor, and a transmission device by which power can be transmitted between the rotor of the turbine and the rotor of the centrifugal compressor.

2. A power unit as claimed in claim 1 in which the device for transmitting power between the turbine rotor and the rotor of the centrifugal compressor is in the form of a hydraulic coupling.

3. A power unit as claimed in claim 2 in which the hydraulic coupling is of the kind capable of transmitting torque in both directions.

4. A power unit as claimed in claim 3 in which the hydraulic coupling is of the kind the filling of which can be varied to render it operative or inoperative.

HERBERT SAMMONS.

References Cited in the file of this patent

UNITED STATES PATENTS

| Number | Name | Date |
| --- | --- | --- |
| 1,814,802 | Herr | July 14, 1931 |
| 1,919,572 | Schmaljohann | July 25, 1933 |
| 2,085,270 | Pavlecka | June 29, 1937 |
| 2,168,726 | Whittle | Aug. 8, 1939 |
| 2,444,456 | Lysholm | July 6, 1948 |
| 2,468,157 | Barlow et al. | Apr. 26, 1949 |
| 2,500,234 | Bates | Mar. 14, 1950 |
| 2,542,539 | Kuhrt et al. | Feb. 20, 1951 |

FOREIGN PATENTS

| Number | Country | Date |
| --- | --- | --- |
| 684,902 | France | Mar. 24, 1930 |
| 556,401 | Great Britain | Oct. 4, 1943 |